US010380242B2

(12) United States Patent
Minnis et al.

(10) Patent No.: US 10,380,242 B2
(45) Date of Patent: Aug. 13, 2019

(54) SYSTEM AND METHOD FOR PROCESSING OUT OF VOCABULARY COMPOUND WORDS

(71) Applicant: Nuance Communications, Inc., Burlington, MA (US)

(72) Inventors: Stephen Minnis, Wymondham (GB); Corinne Bos-Plachez, Baisieux (FR)

(73) Assignee: Nuance Communications, Inc., Burlington, MA (US)

( * ) Notice: Subject to any disclaimer, the term of this patent is extended or adjusted under 35 U.S.C. 154(b) by 312 days.

(21) Appl. No.: 14/712,074

(22) Filed: May 14, 2015

(65) Prior Publication Data

US 2016/0336004 A1 Nov. 17, 2016

(51) Int. Cl.
*G06F 17/27* (2006.01)
*G10L 13/10* (2013.01)

(52) U.S. Cl.
CPC ........ *G06F 17/2735* (2013.01); *G06F 17/273* (2013.01); *G10L 13/10* (2013.01)

(58) Field of Classification Search
CPC ..... G06F 17/2735; G06F 17/273; G10L 13/10
See application file for complete search history.

(56) References Cited

U.S. PATENT DOCUMENTS

| | | | | |
|---|---|---|---|---|
| 5,754,972 | A * | 5/1998 | Baker | G10L 15/04 704/2 |
| 6,393,399 | B1 * | 5/2002 | Even | G10L 15/193 704/235 |
| 7,447,627 | B2 | 11/2008 | Jessee et al. | |
| 9,311,607 | B2 * | 4/2016 | Shinzato | G06F 16/5866 |
| 2003/0014253 | A1 * | 1/2003 | Walsh | G10L 13/08 704/260 |
| 2005/0091030 | A1 * | 4/2005 | Jessee | G06F 17/26 704/4 |
| 2009/0006079 | A1 * | 1/2009 | Van Caldwell | G06F 17/273 704/9 |
| 2009/0058823 | A1 * | 3/2009 | Kocienda | G06F 3/0236 345/173 |
| 2011/0202344 | A1 * | 8/2011 | Meyer | G10L 13/04 704/260 |
| 2013/0019169 | A1 * | 1/2013 | Bastide | G06F 17/273 715/257 |

* cited by examiner

*Primary Examiner* — Walter Yehl
(74) *Attorney, Agent, or Firm* — Ohlandt, Greeley, Ruggiero, & Perle, L.L.P.

(57) ABSTRACT

A system and method for out-of-vocabulary compound word handling is provided. Embodiments may include storing a plurality of compound word rules and compound word dictionaries in a database. Embodiments may also include evaluating membership criteria associated with a received compound word, wherein membership criteria includes at least one of dictionary based or part of speech (POS) based criteria. Embodiments may further include applying one or more filtering rules to the received compound word.

20 Claims, 4 Drawing Sheets

200 storing a plurality of compound word rules and compound word dictionaries in a database

202 evaluating membership criteria associated with a received compound word, wherein membership criteria includes at least one of dictionary based or part of speech (POS) based criteria

204 applying one or more filtering rules to the received compound word

206

300

SYSTEM AND METHOD FOR PROCESSING OUT OF VOCABULARY COMPOUND WORDS

TECHNICAL FIELD

This disclosure relates generally to a method for text to speech systems, and more particularly, to a method for processing out of vocabulary ("OOV") compound words.

BACKGROUND

A compound word is typically created when two or more words are joined together. In this way, compound words by their very definition form a "new" word, with its own meaning, linguistic part of speech and given discourse neutral prominence pattern. For example, a two-word compound word may have default prominence on the left word in the compound word.

Ensuring that the compound word prominence pattern is correct in text-to-speech ("TTS") synthesis is important, as listeners are sensitive to this, and it has a bearing on the perceived quality of the synthesized utterance. This prominence should be the same no matter the orthographic form of the compound word, for example, if it is "fire fly", "fire-fly" or "firefly".

It is notoriously hard to define what constitutes a compound word. Clearly the new compound word will function as a "new" word, and have its own meaning and grammatical part of speech, but the conditions under which this compounding occurs are ill-defined. For example, it is not sufficient to assume that all noun-noun words co-occurring together in text are noun-noun compound words. Most TTS systems handle compounds words by simple dictionary methods only, which has limited effectiveness given the rich compositionality of compound word forms.

SUMMARY OF DISCLOSURE

In one implementation, a method for out-of-vocabulary compound word handling is provided. The method may include storing a plurality of compound word rules and compound word dictionaries in a database. The method may also include evaluating membership criteria associated with a received compound word, wherein membership criteria includes at least one of dictionary based or, part of speech (POS) based criteria. The method may further include applying one or more filtering rules to the received compound word.

One or more of the following features may be included. In some embodiments, evaluating membership criteria may include reviewing one or more orthographic patterns. Applying one or more filtering rules may include generalizing over a list of known compounds in the database. The method may include predicting a compound prominence pattern associated with the compound word. The method may further include predicting a compound pronunciation associated with the compound word. The method may also include predicting a compound part of speech associated with the compound word. The method may further include generating a model based upon, at least in part, the predicted compound prominence pattern, compound pronunciation, and compound part of speech. In some embodiments, the compound word may span more than two words. The method may further include handling compound words written with optional punctuation (such as a hyphen).

In another implementation, a non-transitory computer-readable storage medium is provided. The non-transitory computer-readable storage medium may have stored thereon instructions, which when executed by a processor result in one or more concatenative speech synthesis operations. Operations may include storing a plurality of compound word rules and compound word dictionaries in a database. Operations may also include evaluating membership criteria associated with a received compound word, wherein membership criteria includes at least one of dictionary based or part of speech (POS) based criteria. Operations may further include applying one or more filtering rules to the received compound word.

One or more of the following features may be included. In some embodiments, evaluating membership criteria may include reviewing one or more orthographic patterns. Applying one or more filtering rules may include generalizing over a list of known compounds in the database. The method may include predicting a compound prominence pattern associated with the compound word. The method may further include predicting a compound pronunciation associated with the compound word. The method may also include predicting a compound part of speech associated with the compound word. The method may further include generating a model based upon, at least in part, the predicted compound prominence pattern, compound pronunciation, and compound part of speech. In some embodiments, the compound word may span more than two words. The method may further include handling compound words written with optional punctuation (such as a hyphen).

In another implementation, a system is provided. The system may include one or more processors configured to perform out-of-vocabulary compound word handling is provided. In some embodiments, the one or more processors may be configured to allow for storing a plurality of compound word rules and compound word dictionaries in a database. The one or more processors may be further configured to evaluate membership criteria associated with a received compound word, wherein membership criteria includes at least one of dictionary based or part of speech (POS) based criteria. The one or more processors may be further configured to apply one or more filtering rules to the received compound word.

One or more of the following features may be included. In some embodiments, evaluating membership criteria may include reviewing one or more orthographic patterns. Applying one or more filtering rules may include generalizing over a list of known compounds in the database. The one or more processors may be further configured to predict a compound prominence pattern associated with the compound word.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Embodiments provided herein are directed towards a system and method for processing out of vocabulary compound words. Embodiments may include storing a plurality of compound word rules and compound word dictionaries in a database. Embodiments may also include evaluating membership criteria associated with a received compound word, wherein membership criteria includes at least one of dictionary based, or part of speech (POS) based criteria. Embodiments may further include applying one or more filtering rules to the received compound word.

Figure 1:
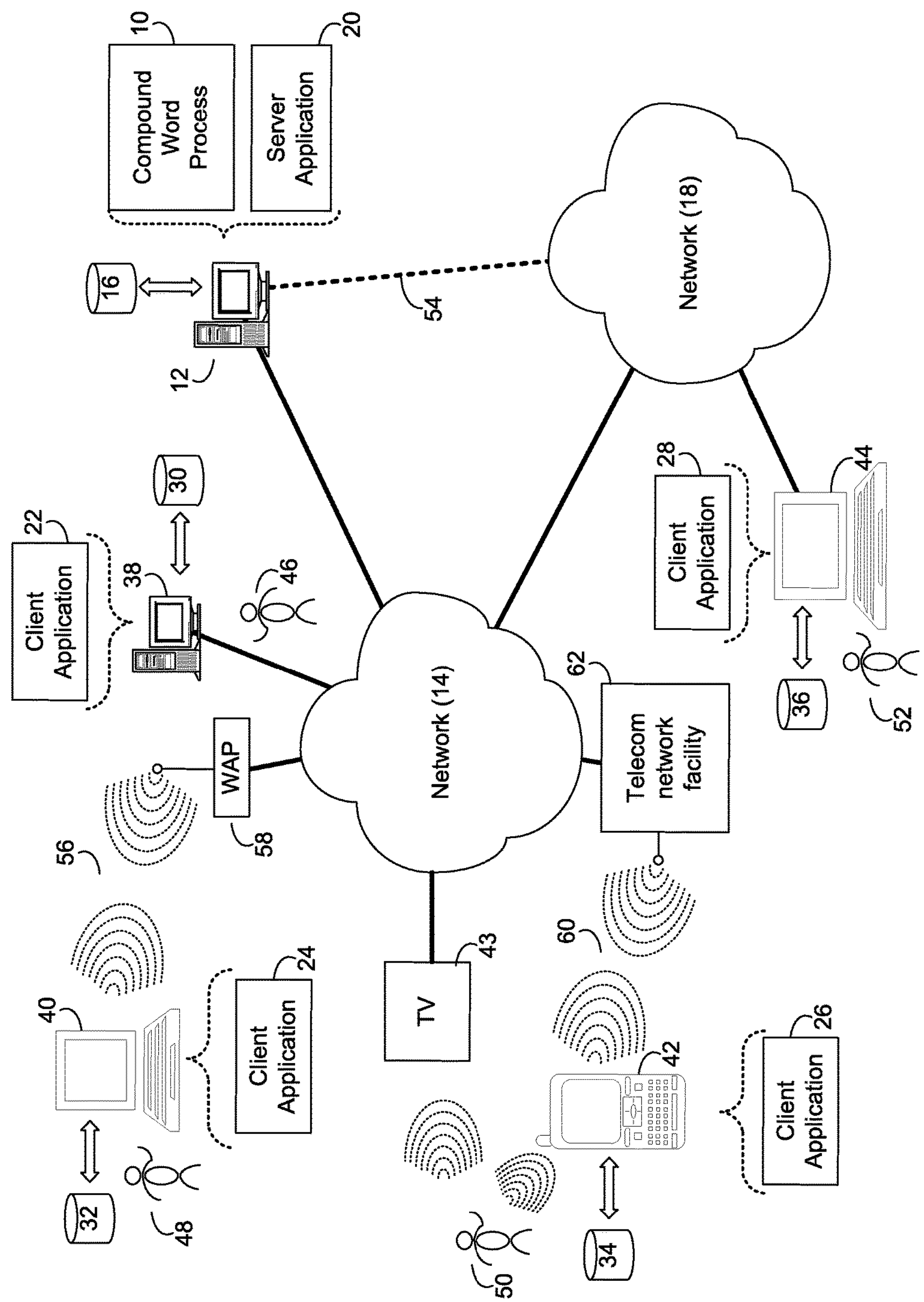
FIG. 1 is a diagrammatic view of a system configured to implement a compound word process in accordance with an embodiment of the present disclosure.

Referring to FIG. 1, there is shown a compound word process 10 that may reside on and may be executed by computer 12, which may be connected to network 14 (e.g., the Internet or a local area network). Server application 20 may include some or all of the elements of compound word process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

Figure 2:
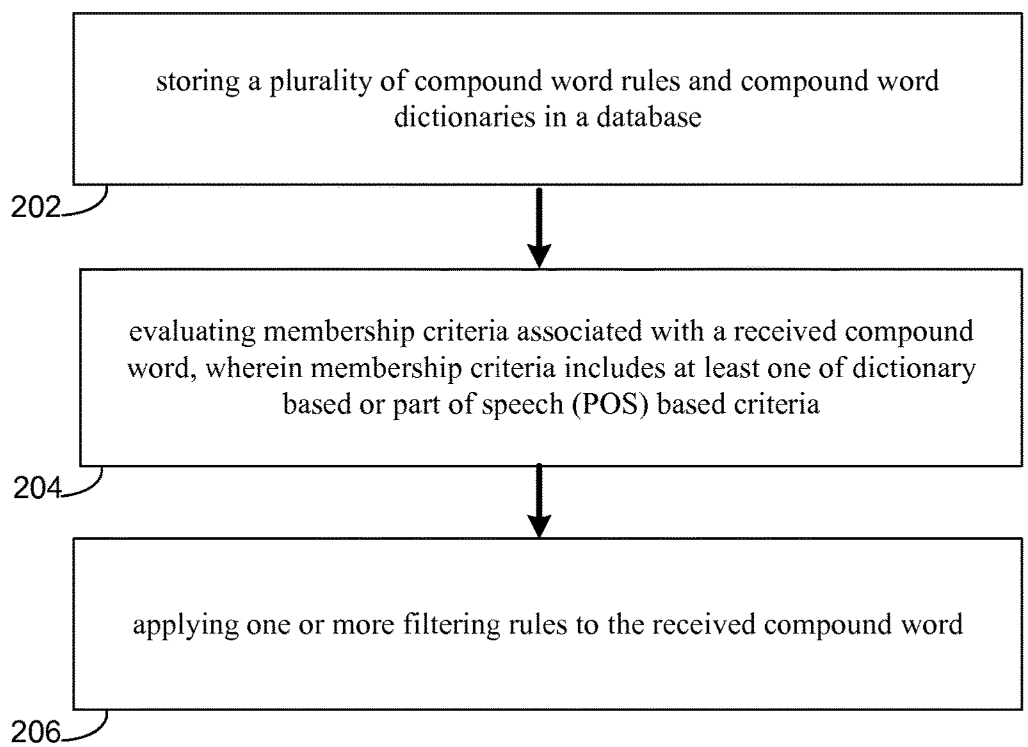
FIG. 2 is a flowchart of a compound word process in accordance with an embodiment of the present disclosure.
Figure 3:
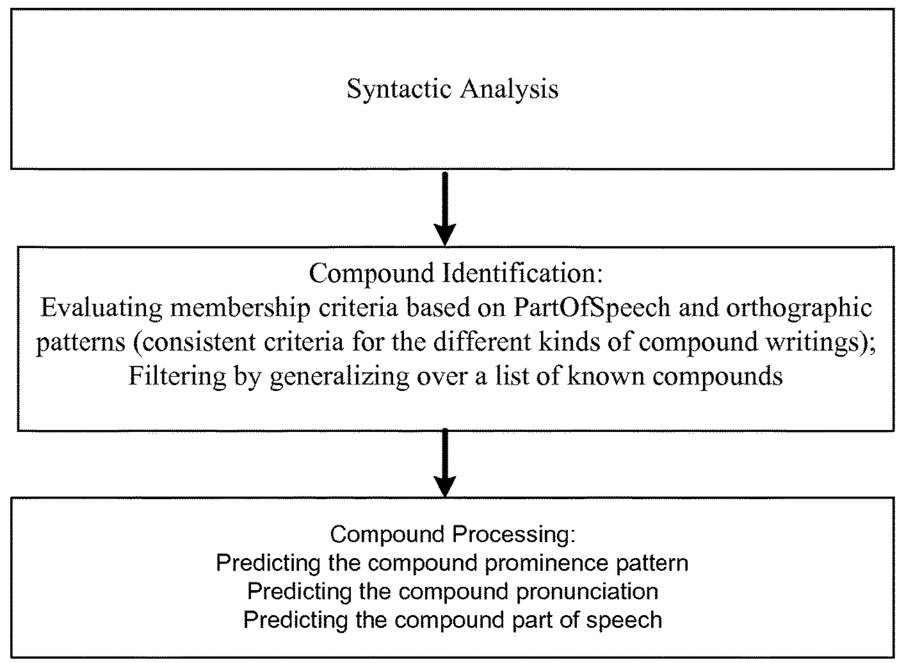
FIG. 3 is a flowchart of a compound word process in accordance with an embodiment of the present disclosure.

As will be discussed below in greater detail in FIGS. 2-4, compound word process 10 (via process 200 and/or process 300) may include storing (202) a plurality of compound word rules and compound word dictionaries in a database and evaluating (204) membership criteria associated with a received compound word, wherein membership criteria includes at least one of dictionary based or part of speech (POS) based criteria. Compound word process 10 may further include applying (206) one or more filtering rules to the received compound word.

The instruction sets and subroutines of compound word process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, compound word process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), a dedicated network device (not shown), an audio recording device, etc.

One or more of client applications 22, 24, 26, 28 may be configured to effectuate some or all of the functionality of compound word process 10. Accordingly, compound word process 10 may be a purely server-side application, a purely client-side application, or a hybrid server-side/client-side application that is cooperatively executed by one or more of client applications 22, 24, 26, 28 and compound word process 10.

Client electronic devices 38, 40, 42, 44 may each execute an operating system, examples of which may include but are not limited to Apple iOS™, Microsoft Windows™, Android™, Redhat Linux™, or a custom operating system. In some cases, the client electronic device may include audio recording functionality and/or may be an audio recording device. Additionally and/or alternatively, in some embodiments an audio recording device may be in communication with one or more of the client electronic devices as is discussed in further detail herein.

Users 46, 48, 50, 52 may access computer 12 and compound word process 10 directly through network 14 or through secondary network 18. Further, computer 12 may be connected to network 14 through secondary network 18, as illustrated with phantom link line 54. In some embodiments, users may access compound word process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14. In some embodiments, smartphone 42 may be an audio recording device or may include audio recording functionality and may enable an end user to record a speech signal.

The speech signal may be stored and/or transmitted to any of the devices described herein. For example, transmitted over network 14 to client electronic device 40.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between any of the computing devices shown in FIG. 1 (e.g., between cellphone 42 and server computing device 12).

Embodiments of compound word process 10 may be configured to identify Out of Vocabulary compound words, which provides the ability to predict compound prominence, compound part of speech (POS), and other linguistic features that may allow for the modeling of complex back-end prosodic phenomena. It should be noted that although many of the examples and embodiments included herein discuss 2-word compound words, the teachings of the present disclosure may be applied to longer multi-word compounds (e.g., not only the more common noun+noun or adjective+noun compounds).

As discussed above, compound words are commonly found in language, and new ones are created on a daily basis. It would therefore be impractical to add all possible compound words to a TTS dictionary. Embodiments of compound word process 10 may be configured to address this issue.

Existing approaches that address the prediction of compound word prominence use hand annotated compound words in corpora as a starting point for their research (e.g. to evaluate predictive approaches to compound word prominence), which means that they skip the problem of compound detection.

Embodiments of compound word process 10 may be configured to handle both in-dictionary and Out of Vocabulary ("OOV") compound words in a text-to-speech system. Accordingly, compound word process 10 may utilize a data driven method that recognizes compound words using rules that define a number of different categories. Some of these rules may include, but are not limited to, a "membership criteria" defining a compound word (e.g., dictionary or part of speech based), filtering rules (e.g., to avoid over-generation in membership (rule out co-occurrence examples), part of speech determination for the compound word, prominence determination for the compound word, etc. It should be noted that rule-based and/or statistical methods may be used internal to these rules, for example, prominence prediction, for filtering, etc. For example, instead of generalizing based upon an existing dictionary, embodiments of compound word process 10 may be configured to generalize from other features, such as the semantic properties of words (e.g. firstword=concept-RoadName), word frequency information, etc.

In some embodiments, OOV compound words may be first identified by extended dictionary based methods. The premise is that if a word commonly appears as the first or last word of a compound word with a given part of speech, then it is likely that that word can appear in other unseen compound words in the same position. So a word like "post" which appears in "post box", "post man" could also appear in rarer cases like "post mark", or "post boy".

Identifying a compound word using extended dictionary methods could also be used to predict the compound prominence, since we would typically observe a most frequent pattern based on occurrences. Suppose a word like "post" is observed in two word noun-noun compounds as being left side prominent 80% of the time, and right side prominent 20% of the time. This simple approach is not very flexible and it is clear that many factors come into play with the prediction of compound prominence. It should be noted that the framework described herein may define a fall-back prominence and part of speech. In the case of noun-noun compounds most examples in English are left side prominent. This would be the default if a no confidence situation exists (e.g. if the extended dictionary approach had to choose between 50% left and 50% right side data).

Embodiments of compound word process 10 may be configured to allow rules or statistical methods to be applied to prominence determination of words that pass the membership criteria for that compound, and also the fallback to a safe default value if no solution is obvious. The application of statistical methods allows a wider variety of information to be applied to the prominence prediction, including context and discourse information (if relevant), which cannot be easily accommodated in static dictionary entries. It should be noted that statistics may also introduce confidence levels for prediction.

Embodiments of compound word process 10 may apply advanced approaches (e.g., dictionary based, rule-based, statistical, etc.) to compound word related processing, which may include, for example, compound word detection, default prominence prediction, and compound word part of speech prediction. Additionally and/or alternatively, compound word process 10 may be configured to handle various types of compounds in the framework, some of which may include, but are not limited to, noun+noun, adjective+noun compounds as well as compound words of any length.

In some embodiments, compound word process 10 may be implemented as a data driven method, where compound word rules may be defined in a data file. These compound word rules along with associated compound word dictionaries and statistical methods may be combined to create a complete integrated approach to handle compound words in one or more products, such as the Vocalizer products available from the Assignee of the present disclosure.

In accordance with an embodiment of compound word process 10 an example compound word rule for noun-noun compounds is given below.

```
[RULE]
[LABEL]
COMPOUND_N+N
[DICTIONARY]
compounds_n_n
[MEMBERSHIP]
WORD1 _ [POS ^(N)] ![POS ^(NNP|NN[+]POS|NNP[+]POS)$] _
WORD2 _ [POS ^(N)] ![POS ^(NNP)] _
_ i[ORT (^apple pie$)] _
[MEMBERSHIPFILTER]
FILTER_BLOCK_ACROSS_TOKEN_BOUNDARIES
ALGO_INLEXICON
ALGO_EXTENDEDLEXMATCH
ELSE_IGNORE
[COMPOUNDPOS]
SETDEFAULT NN ; compound word POS
[COMPOUNDPROM]
MATCHED_ALGO_INLEXICON
IGTREE NN_PRM
SETDEFAULT LS
```

The compound rule is defined by sections annotated with [ ] delimiters in a data file. A [RULE] section starts the definition of a compound word rule, and contains multiple related sections. The rule is given a name in the [LABEL] section. The rule is tied to a dictionary named in the [DICTIONARY] section.

In the [MEMBERSHIP] section for this particular two word compound, WORD1 and WORD2 are two words separated by a space. The equivalent for a hyphenated two word compound HWORD1 and HWORD2 would be separated by a hyphen. Hyphenated compound words may receive different processing than space separated processing.

The [MEMBERSHIP] section defines the POS membership criteria in this particular embodiment through regular expression rules. For example WORD2_[POS ^(N)] ![POS ^(NNP)]_ indicates that WORD starts with a N tag, and is not a NNP tag. This would match all noun tags starting with a POS N.

Since POS tagging is not perfect, occasionally membership will need to be defined by orthographic rules. The example given, _i[ORT (^apple pie$)]_, is in semi-regular expression format, it indicates a case insensitive match with the exact word "apple pie".

The [MEMBERSHIPFILTER] acts on any potential compound word to filter out those that the system chooses to ignore. The keyword FILTER_BLOCK_ACROSS_TOKEN_BOUNDARIES indicates that no compound words are allowed across token boundaries (where a token is some form of special orthography such as date, time, numbers, currencies, which are usually expanded to their orthographic forms in text to speech systems.). The keyword ALGO_INLEXICON indicates that if the compound word under consideration is in the dictionary then it is accepted. The keyword ALGO_EXTENDEDLEXMATCH indicates that if the first or last word of the compound word under consideration is in the dictionary as a first or last word, then the compound word is accepted.

These three filters act one after the other. If none of them succeed the keyword ELSE_IGNORE blocks the membership for this particular compound word and the rule fails.

The [COMPOUNDPOS] section sets the POS for the compound word. This may be a default or set via rules or statistical approaches.

The [COMPOUNDPROM] section defines the compound default prominence. For a two word compound we might have LS=left side prominence and RS=right side prominence. The MATCHED_ALGO_INLEXICON keyword fires if the compound membership filter was ALGO_INLEXICON, in this case the prominence is found in the dictionary. For OOV compounds, found via the ALGO_EXTENDEDLEXMATCH in this rule, we could use a simple 'most frequent' assignation of prominence (based on the frequency of first/last words in the compound word dictionary associated with the rule), or use a statistical method. One such method is the IGTREE method, in the rule IGTREE NN_PRM indicates that the igtree model named "NN_PRM" is to be used to predict prominence. A default prominence value may be assigned via the keyword SETDEFAULT, should statistical confidence, or frequency based measures be inconclusive.

The "IGTREE" model referred to in the above rule is a statistical approach supported by rules. It should be noted that this model is only one of many statistical approaches that could be used in accordance with the teachings of the present disclosure. Additional information regarding Igtree may be found, for example, in "Igtree: Using Trees for Compression and Classification in Lazy learning Algorithms" W. Daelemans, A. van den Bosch, T. Weijters, 1997.

In some embodiments, compound word process 10 may be configured to process hyphenated words. Accordingly, for consistency of processing; (single) hyphens in words may be normalized to underscores. Underscores are used as internally as a mechanism to tie individual words together, so a two-word hyphenated word could still be processed as two individual words. In some embodiments, domain specific OOV compound word detection may be added.

In some embodiments, a parameter or data file setting may be defined that dictates whether a compound word should be joined or not. This would provide the ability to join compound words in a language specific manner, and to experiment with joining, Consider the examples "fire fly", "fire-fly" or "firefly". The compound word rule example for noun-noun compounds discussed above would detect the first two examples, and annotate them as a compound word with prominence on one of the words. Joining means that the two words are re-written as one, with any appropriate phonetic changes. For example instead of prominence, primary and secondary stress may be used. There will usually be pragmatic reasons for and against joining. For example, handling contrastive prominence is probably more easily handled by keeping the words separate, as would be compound words greater than two individual words. Joining on the other hand provides a consistent approach across all compound word forms (e.g., spaced, hyphenated, and no space).

In some embodiments, compound word process 10 may be configured to provide numerous types of symbolic information for use in synthesis. some of which may include, but is not limited to, a compound word feature, a compound word POS, a compound word PRM values, lexical stress.

Figure 4:
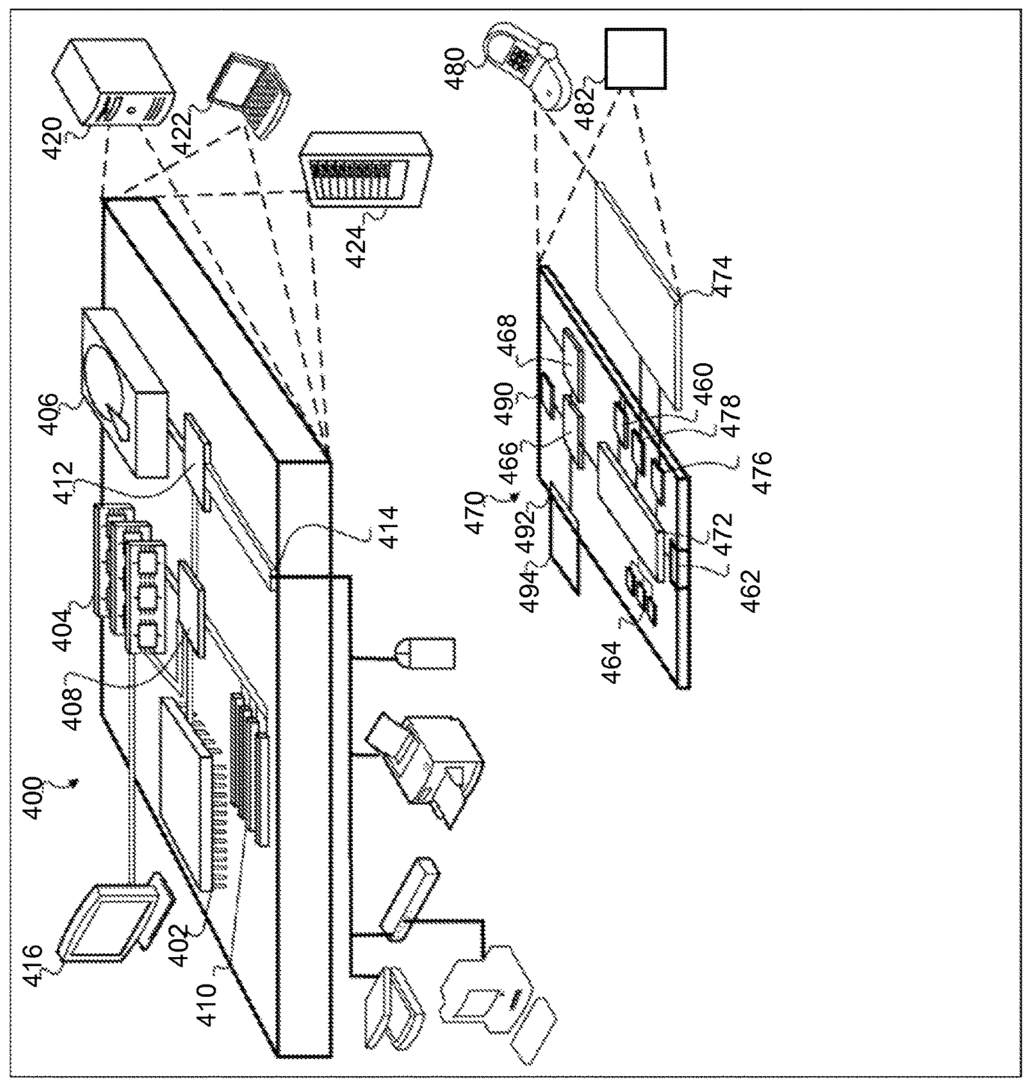
FIG. 4 shows an example of a computer device and a mobile computer device that can be used in accordance with the compound word process described herein.

Referring now to FIG. 4, an example of a generic computer device 400 and a generic mobile computer device 470, which may be used with the techniques described here is provided. Computing device 400 is intended to represent various forms of digital computers, such as tablet computers, laptops, desktops, workstations, personal digital assistants, servers, blade servers, mainframes, and other appropriate computers. In some embodiments, computing device 470 can include various forms of mobile devices, such as personal digital assistants, cellular telephones, smartphones, and other similar computing devices. Computing device 470 and/or computing device 400 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 400 may include processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, may be interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multiprocessor system).

Memory 404 may store information within the computing device 400. In one implementation, the memory 404 may be a volatile memory unit or units. In another implementation, the memory 404 may be a non-volatile memory unit or units. The memory 404 may also be another form of computer-readable medium, such as a magnetic or optical disk.

Storage device 406 may be capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

High speed controller 408 may manage bandwidth-intensive operations for the computing device 400, while the low speed controller 412 may manage lower bandwidth-intensive operations. Such allocation of functions is exemplary only. In one implementation, the high-speed controller 408 may be coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 470. Each of such devices may contain one or more of computing device 400, 470, and an entire system may be made up of multiple computing devices 400, 470 communicating with each other.

Computing device 470 may include a processor 472, memory 464, an input/output device such as a display 474, a communication interface 466, and a transceiver 468, among other components. The device 470 may also be provided with a storage device, such as a microdrive or other device, to provide additional storage. Each of the components 470, 472, 464, 474, 466, and 468, may be interconnected using various buses, and several of the components may be mounted on a common motherboard or in other manners as appropriate.

Processor 472 may execute instructions within the computing device 470, including instructions stored in the memory 464. The processor may be implemented as a chipset of chips that include separate and multiple analog and digital processors. The processor may provide, for example, for coordination of the other components of the device 470, such as control of user interfaces, applications run by device 470, and wireless communication by device 470.

In some embodiments, processor 472 may communicate with a user through control interface 478 and display interface 476 coupled to a display 474. The display 474 may be, for example, a TFT LCD (Thin-Film-Transistor Liquid Crystal Display) or an OLED (Organic Light Emitting Diode) display, or other appropriate display technology. The display interface 476 may comprise appropriate circuitry for driving the display 474 to present graphical and other information to a user. The control interface 478 may receive commands from a user and convert them for submission to the processor 472. In addition, an external interface 462 may be provide in communication with processor 472, so as to enable near area communication of device 470 with other devices. External interface 462 may provide, for example, for wired communication in some implementations, or for wireless communication in other implementations, and multiple interfaces may also be used.

In some embodiments, memory 464 may store information within the computing device 470. The memory 464 can be implemented as one or more of a computer-readable medium or media, a volatile memory unit or units, or a non-volatile memory unit or units. Expansion memory 474 may also be provided and connected to device 470 through expansion interface 472, which may include, for example, a SIMM (Single In Line Memory Module) card interface. Such expansion memory 474 may provide extra storage space for device 470, or may also store applications or other information for device 470. Specifically, expansion memory 474 may include instructions to carry out or supplement the processes described above, and may include secure information also. Thus, for example, expansion memory 474 may be provide as a security module for device 470, and may be programmed with instructions that permit secure use of device 470. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 464, expansion memory 474, memory on processor 472, or a propagated signal that may be received, for example, over transceiver 468 or external interface 462.

Device 470 may communicate wirelessly through communication interface 466, which may include digital signal processing circuitry where necessary. Communication interface 466 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 470, which may be used as appropriate by applications running on device 470.

Device 470 may also communicate audibly using audio codec 460, which may receive spoken information from a user and convert it to usable digital information. Audio codec 460 may likewise generate audible sound for a user, such as through a speaker, e.g., in a handset of device 470. Such sound may include sound from voice telephone calls, may include recorded sound (e.g., voice messages, music files, etc.) and may also include sound generated by applications operating on device 470.

Computing device 470 may be implemented in a number of different forms, as shown in the figure. For example, it may be implemented as a cellular telephone 480. It may also be implemented as part of a smartphone 482, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for out-of-vocabulary compound word handling comprising:

storing a plurality of compound word rules and compound word dictionaries in a database;

evaluating membership criteria associated with a received compound word, wherein membership criteria includes at least one of dictionary based or part of speech (POS) based criteria;

applying one or more filtering rules to the received compound word;

identifying the received compound word as an out-of-vocabulary compound word based upon, at least in part, the one or more filtering rules, wherein the one or more filtering rules includes determining whether one of a first word and a last word of the received compound word is one of the first word and the last word in the compound word dictionaries;

predicting a compound prominence pattern associated with the received compound word based upon, at least in part, identifying the received compound word as the out-of-vocabulary compound word, wherein the compound prominence pattern includes a default compound prominence when a no confidence situation exists for predicting the compound prominence pattern associated with the received compound word in the out-of-vocabulary compound word handling for text-to-speech synthesis, wherein the default compound prominence includes one of right side prominence and left side prominence for a portion of the compound word; and generating an output representative of the received compound word based upon, at least in part, the default compound prominence.

2. The computer-implemented method of claim 1, wherein evaluating membership criteria includes reviewing one or more orthographic patterns.

3. The computer-implemented method of claim 1, wherein applying one or more filtering rules includes generalizing over a list of known compounds in the database.

4. The computer-implemented method of claim 1, further comprising:

predicting a compound pronunciation associated with the compound word.

5. The computer-implemented method of claim 4, further comprising:

predicting a compound part of speech associated with the compound word.

6. The computer-implemented method of claim 5, further comprising:

generating a model based upon, at least in part, the predicted compound prominence pattern, compound pronunciation, and compound part of speech.

7. The computer-implemented method of claim 1, wherein the compound word is a compound word with more than two words.

8. The computer-implemented method of claim 1 further comprising ruling out a co-occurrence of the received compound word based upon, at least in part, applying the one or more filtering rules to the received compound word.

9. The computer-implemented method of claim 1 wherein the no confidence situation exists when available statistical confidence for the received compound word is 50% for both right side prominence and left side prominence.

10. The computer-implemented method of claim 1 wherein the output is an audible output.

11. A non-transitory computer-readable storage medium having stored thereon instructions, which when executed by a processor result in one or more operations for out-of-vocabulary compound word handling, the operations comprising:

storing a plurality of compound word rules and compound word dictionaries in a database;

evaluating membership criteria associated with a received compound word, wherein membership criteria includes at least one of dictionary based or part of speech (POS) based criteria;

applying one or more filtering rules to the received compound word;

identifying the received compound word as an out-of-vocabulary compound word based upon, at least in part, the one or more filtering rules, wherein the one or more filtering rules includes determining whether one of a first word and a last word of the received compound word is one of the first word and the last word in the compound word dictionaries;

predicting a compound prominence pattern associated with the received compound word based upon, at least in part, identifying the received compound word as the out-of-vocabulary compound word, wherein the compound prominence pattern includes a default compound prominence when a no confidence situation exists for predicting the compound prominence pattern associated with the received compound word in the out-of-vocabulary compound word handling for text-to-speech synthesis, wherein the default compound prominence includes one of right side prominence and left side prominence for a portion of the compound word; and generating an output representative of the received compound word based upon, at least in part, the default compound prominence.

12. The non-transitory computer-readable storage medium of claim 11, wherein evaluating membership criteria includes reviewing one or more orthographic patterns.

13. The non-transitory computer-readable storage medium of claim 11, wherein applying one or more filtering rules includes generalizing over a list of known compounds in the database.

14. The non-transitory computer-readable storage medium of claim 11, further comprising:

predicting a compound pronunciation associated with the compound word.

15. The non-transitory computer-readable storage medium of claim 14, further comprising:

predicting a compound part of speech associated with the compound word.

16. The non-transitory computer-readable storage medium of claim 15, further comprising:

generating a model based upon, at least in part, the predicted compound prominence pattern, compound pronunciation, and compound part of speech.

17. The non-transitory computer-readable storage medium of claim 14, wherein the compound word has more than two words.

18. A system configured to perform out-of-vocabulary compound word handling comprising:

one or more processors configured to allow for storing a plurality of compound word rules and compound word dictionaries in a database, the one or more processors further configured to evaluate membership criteria associated with a received compound word, wherein membership criteria includes at least one of dictionary based or part of speech (POS) based criteria, the one or more processors further configured to identify the received compound word as an out-of-vocabulary compound word based upon, at least in part, the one or more filtering rules, wherein the one or more filtering rules determining whether one of a first word and a last word of the received compound word is one of the first word and the last word in the compound word dictionaries, the one or more processors further configured to apply one or more filtering rules to the received compound word, the one or more processors further configured to predict a compound prominence pattern associated with the received compound word based upon, at least in part, identifying the received compound word as the out-of-vocabulary compound word, wherein the compound prominence pattern includes a default compound prominence when a no confidence situation exists for predicting the compound prominence pattern associated with the received compound word in the out-of-vocabulary compound word handling for text-to-speech synthesis, wherein the default compound prominence includes one of right side prominence and left side prominence for a portion of the compound word, the one or more processors further configured to generate an output representative of the received compound word based upon, at least in part, the default compound prominence.

19. The system of claim 17, wherein evaluating membership criteria includes reviewing one or more orthographic patterns.

20. The system of claim 17, wherein applying one or more filtering rules includes generalizing over a list of known compounds in the database.

* * * * *